J. A. POPE & W. L. D. POPE.
Improvement in Cotton-Planters.
No. 126,487. Patented May 7, 1872.

Witnesses:
Inventor:
J. A. Pope
W. L. D. Pope
Per
Attorneys.

126,487

UNITED STATES PATENT OFFICE.

JOHN A. POPE AND WILLIAM L. D. POPE, OF CHARLOTTE, NORTH CAROLINA.

IMPROVEMENT IN COTTON-PLANTERS.

Specification forming part of Letters Patent No. 126,487, dated May 7, 1872.

Specification describing a new and useful Improvement in Cotton-Seed Planter, &c., invented by JOHN A. POPE and WILLIAM L. D. POPE, of Charlotte, in the county of Mecklenburgh and State of North Carolina.

Figure 5:
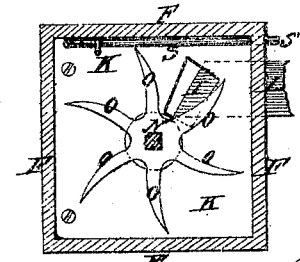
Figure 1:
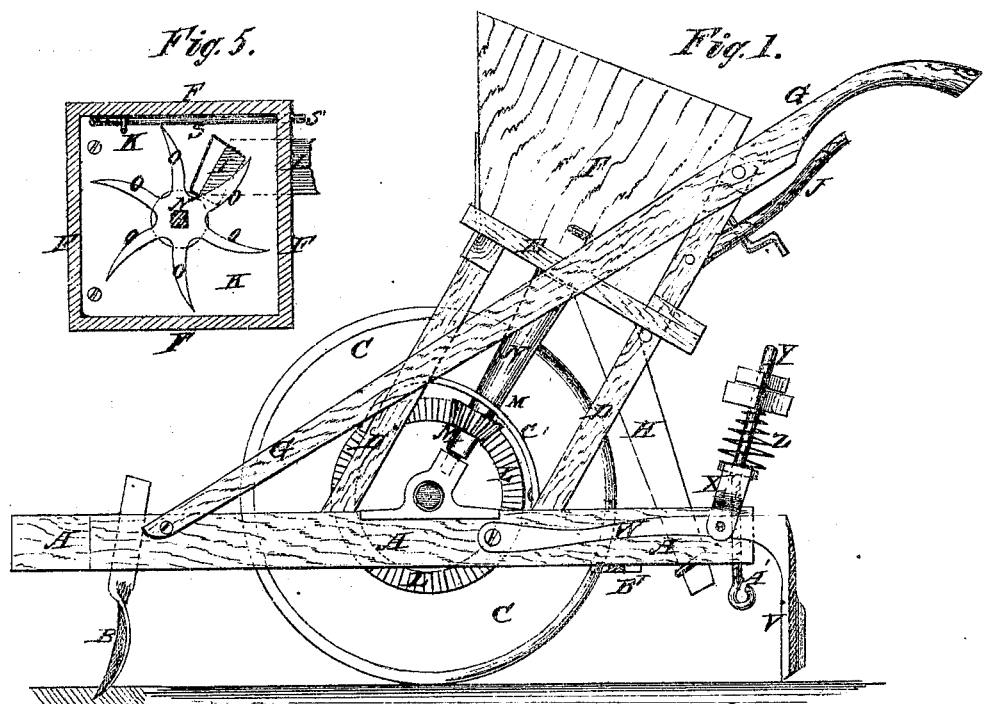
Figure 3:
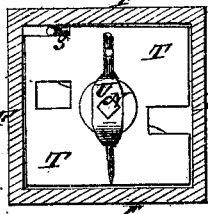
Figure 4:
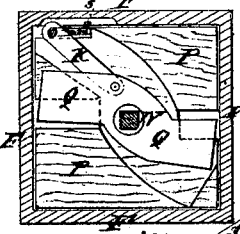
Figure 2:
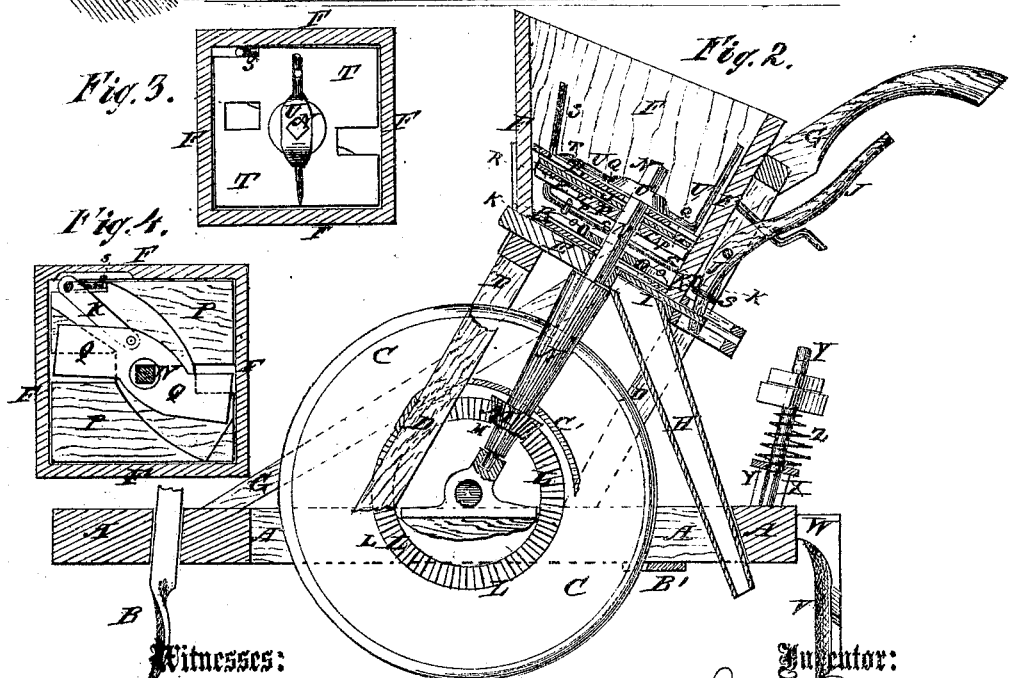

Figure 1 is a side view of our improved planter. Fig. 2 is a detail longitudinal section of the same. Fig. 3 is a top view of the hopper. Fig. 4 is the same view as Fig. 3, but with the upper plate and stirrer removed. Fig. 5 is the same view as Fig. 3, but with the two upper plates, the stirrer, and the upper valves removed.

Similar letters of reference indicate corresponding parts.

Our invention has for its object to furnish an improved machine for planting cotton-seed, distributing guano or other fine fertilizers, and which shall be simple in construction, convenient in use, and effective in operation; and it consists in the construction and combination of various parts of the machine, as hereinafter more fully described.

A is the frame of the machine, to the forward end of which the draft is attached, and to the forward part of which is attached the plow B, by which the furrow is opened to receive the seed. In the central part of the frame A is formed a slot or opening to receive the driving-wheel C, the journals of which revolve in bearings attached to said frame A, and the face of which is rounded off or made V-shaped, to press open the furrow to receive the seed. To the frame A, upon each side of the wheel C, are attached standards D, which project upward and incline inward, and to the upper ends of which is attached the platform E, which supports the hopper F. The rear standards D project upward along the rear side of the hopper F, to further support said hopper, and to support the handles G at the proper elevation. The forward ends of the handles G are attached to the sides of the forward part of the frame A. To the lower side of the platform E is attached the upper end of a spout, H, which receives the seed through a hole in the platform E and conducts it to the furrow in the rear of the wheels C. In the upper side of the platform E is formed a recess to receive a slide, I, the rear end of which is connected with the lower end of the lever J, which is pivoted to the upwardly-projecting parts of the rear standards D, so that the slide I may be conveniently operated to open and close the hole through the platform E by simply operating the lever J. The slide I is covered and protected by a plate, K, attached to the upper side of the platform E, and which has a hole formed through it corresponding with the hole through the said platform E. To the side of the wheel C is attached a bevel-gear wheel, L, the teeth of which mesh into the teeth of the small bevel-gear wheel M attached to the lower part of the shaft N, the lower end of which revolves in a bearing attached to the frame A. The shaft N passes up through the center of the hopper F, as shown in Fig. 2. To the upper part of the shaft N, just above the plate K, is attached a feeder, O, consisting of a hub provided with curved radial arms, as shown in Fig. 5, which sweep the seed upon the plate K into the discharge-hole in the said plate. The lower sides of the arms of the feeder O are beveled off on their lower sides, so that they may tend to force the seed down into said hole. P is a plate placed in the hopper F above the feeder O, and which rests upon the inclined sides of said hopper, or upon cleats attached to said sides. The plate P has one, two, or more holes formed through it, through which the seed passes to the feeder-chamber above the plate K. In recesses in the upper side of the plate P is placed a plate, Q, having as many arms as the plate P has holes formed through it. The plate Q is pivoted to the shaft N, and has an arm, R, pivoted to it, the other end of which is pivoted to the end of a rod, S, which passes down through a slot or notch in the plate P, is bent at right angles, passes back along the side of the hopper F, out through the rear side of said hopper, and is connected with the lever J, so that the holes through the plate P may be closed at the same time and by the same operation as the hole through the plate or platform E. The armed plate Q is covered and protected by a plate, T, placed in the hopper F above the plate P, and which has a hole or holes formed through it corresponding with the hole or holes through the plate P. To the shaft N, above the plate T, is attached a stirrer, U, by which the seed or fertilizer in the hopper S is stirred up and caused to pass through the hole or holes in the plates T P.

The seed is covered by the covering-plows V, which are formed upon or attached to the rear ends of the bars W, the forward ends of which are pivoted to the sides of the frame A. The covering-plows V W are connected by a stirrup or bent bar, X, which passes over the rear end of the frame A, and through the center of which passes the guide-rod Y attached to the rear end of the frame A. Z is a coiled-wire spring placed upon the upper part of the rod Y, and the lower end of which rests upon the bar X, and its upper end rests against a washer and nut placed upon the upper end of said guide-rod Y. By this construction the covering-plows are held down to their work by the spring Z, the tension of which may be readily adjusted as required by turning the nut upon the said rod Y. The depth to which the covering-plows enter the ground is regulated and limited by a set-screw, A′, which passes up through the rear end of the frame A, and the forward end of which rests against the under side of the bar X. B′ is a scraper attached to the frame A, and which is so formed as to fit upon the face of the wheel C to scrape off any soil that may adhere to said wheel, and which might prevent it from operating properly. C′ is a shield, through a hole in which the shaft N passes, and which is attached to the frame A. The shield C′ is designed to protect the gearing L M from any soil, sand, or dirt that may be carried up by the wheel C, and which might drop upon and clog or impede the said wheels L M.

Having thus described our invention, what we claim as new, and desire to secure by Letters Patent, is—

1. The perforated platform and plate E K, feeder O, perforated plates P, and stirrer U, arranged in the hopper F, as shown and described.

2. The combination of the slide I, pivoted armed plate Q, pivoted bar R, sliding rod S, and lever J with the platform E, plates K P T, and hopper F, substantially as herein shown and described, and for the purpose set forth.

JOHN A. POPE.
WM. L. D. POPE.

Witnesses:
J. L. BROWN,
J. G. HARRIS.